United States Patent [19]
Lee et al.

[11] Patent Number: 5,909,444
[45] Date of Patent: Jun. 1, 1999

[54] SYSTEM, DEVICE, AND METHOD FOR AGGREGATING USERS IN A SHARED-MEDIUM NETWORK

[75] Inventors: Whay Chiou Lee, Cambridge; Krishnan Ramakrishnan, Mansfield, both of Mass.

[73] Assignee: Motorola, Inc., Schaumburg, Ill.

[21] Appl. No.: 08/766,059

[22] Filed: Dec. 16, 1996

[51] Int. Cl.$^6$ .................................................. H04J 3/02
[52] U.S. Cl. .................................... 370/462; 370/229
[58] Field of Search .................................. 370/401, 402, 370/422, 433, 434, 455, 462, 465, 468, 229, 230, 232, 234, 235, 241, 245, 247, 251, 252, 253, 447, 436.1, 431, 449.1, 442, 463, 464, 478, 389, 908, 907; 395/200.55, 200.79, 287, 293, 728, 729; 340/825.08

[56] References Cited

U.S. PATENT DOCUMENTS

| | | | |
|---|---|---|---|
| 4,897,874 | 1/1990 | Lidinsky et al. | 370/422 |
| 5,434,863 | 7/1995 | Onishi et al. | 370/402 |
| 5,444,692 | 8/1995 | Basso et al. | 370/402 |
| 5,479,404 | 12/1995 | Francois et al. | 370/468 |

OTHER PUBLICATIONS

Grossman, Dan; Levent, Gun; Krishnan, Ram; Lee, Whay; *Open Issues for ATM Over Shared Media RBB Access Networks*, Apr. 1996, dan |ram| whay @ama.isg.mot.com, llg004@email.mot.com.

Bisdikian, Chatschik; McNeil, Bill; Norman, Rob; Zeisz, Ray; MLAP: A MAC Level Access Protocol for the HFC 802.14 Network, Mar. 1996, IEEE Communications Magazine, 0163–6804 96, pp. 114–121.

*Primary Examiner*—Dang Ton
*Attorney, Agent, or Firm*—Jeffrey T. Klayman; Terri Hughes; Joanne N. Pappas

[57] ABSTRACT

A system (800), device (820), and method (600, 700) for aggregating MAC users in a shared medium network improve MAC performance and minimize complexity of a headend scheduler by aggregating a number of MAC Users into an Aggregate MAC User. The Aggregate MAC User acts as a proxy for its Constituent MAC Users by contending for network resources on behalf of the Constituent MAC Users and allocating network resources to the Constituent MAC Users as needed.

10 Claims, 5 Drawing Sheets

— PRIOR ART —

— PRIOR ART —

— PRIOR ART —

— PRIOR ART —

SYSTEM, DEVICE, AND METHOD FOR AGGREGATING USERS IN A SHARED-MEDIUM NETWORK

CROSS-REFERENCE TO RELATED APPLICATIONS

This application is related to the following U.S. applications, all of which are owned by the same assignee as the assignee of this application and all of which are incorporated by reference herein in their entireties:

Device, Router, Method and System for Providing a Hybrid Multiple Access Protocol for Users With Multiple Priorities, U.S. Ser. No. 08/526,295, to Chester A. Ruszczyk and Levent Gün, filed on Sep. 11, 1995 (applicant docket number CX095022);

Method, Device and Router for Providing a Contention-Based Reservation Mechanism Within a Mini-Slotted Dynamic Entry Polling Slot, U.S. Ser. No. 08/526,517, to Chester A. Ruszczyk and Levent Gün, filed on Sep. 11, 1995 now Pat. No. 5,615,212, (applicant docket number CX095023); and Apparatus and Method for Translating QoS Parameters for Per-Service Category Aggregation, U.S. Ser. No. 08/766,080, (applicant docket number CX096042), to Krishnan Ramakrishnan and Whay Chiou Lee, filed Dec. 16, 1996.

BACKGROUND

1. Field of the Invention

The invention relates generally to communication systems and, more particularly, to aggregating users in a shared-medium network for scaleable media access control.

2. Discussion of Related Art

In today's information age, there is an increasing need for high speed communications that provides guaranteed quality of service (QoS) for an ever-increasing number of communications consumers. To that end, communications networks and technologies are evolving to meet current and future demands. Specifically, new networks are being deployed which reach a larger number of end users, and protocols are being developed to utilize the added bandwidth of these networks efficiently.

One technology that will be employed increasingly in the future is the shared-medium network. A shared medium network is one in which a single communications channel (the shared channel) is shared by a number of end users such that uncoordinated transmissions from different end users may interfere with each other. In modern broadband communications networks, the shared communications channel is typically one of a number of frequency bands carried over a shared physical medium, such as a hybrid fiber-optic/coaxial cable (HFC) network or by electromagnetic waves in free space. Since communications networks typically have a limited number of communications channels, the shared medium network allows many end users to gain access to the network over a single communications channel, thereby allowing the remaining communications channels to be used for other purposes. However, the shared medium network is only feasible when each end user only transmits data intermittently, allowing other end users to transmit during periods of silence.

In the shared medium network, each end user interfaces to the shared channel by means of a Medium Access Interface Unit (MAIU) which allows the end user to transmit and receive information via the shared channel. A single MAIU may support one or a number of end users. Each end user wishing to utilize the shared channel participates in a Medium Access Control (MAC) protocol which provides a set of rules and procedures for accessing the shared channel. For convenience, each participant in the MAC protocol is referred to as a MAC User.

A number of different MAC protocols have been developed for use over a shared channel. These protocols can generally be categorized as contention-free protocols, which avoid collisions on the shared channel by means of various scheduling methods, and contention-based protocols, which do not avoid collisions but instead resolve any collisions that do occur on the shared channel. Contention-free protocols, such as time-division multiple access (TDMA) and polled protocols, are typically less efficient than contention-based protocols under light loads because the contention-free protocols generally allocate some amount of bandwidth to each MAC User whether or not the MAC User has information to send. On the other hand, contention-based protocols only allocate bandwidth to those MAC Users that have information to send, although some amount of bandwidth is wasted whenever collision resolution is required. Thus, the effectiveness of a MAC protocol is generally dependent on the number of MAC Users.

There are many variations of each protocol category. One contention-based MAC protocol uses a single headend unit, situated at a common receiving end of the shared channel and able to transmit messages to all MAC Users sharing the channel, to coordinate access to the shared channel. Specifically, a reservation-based mechanism is employed whereby the headend unit transmits a reservation opportunity message to a group of MAC Users, allowing any of that group of MAC Users that want to transmit to respond on the shared channel with a reservation request message via their respective MAIUs. If only one MAC User wants to transmit, then the reservation request message is received by the headend unit, and the reservation is successful. On the other hand, if multiple MAC Users want to transmit, then the multiple reservation request messages collide on the shared channel. When the headend unit detects a collision on the shared channel, it attempts to resolve the collision by sending additional reservation opportunity messages, each message sent to an increasingly smaller subset of MAC Users, until each MAC User that wants to transmit is able to make a successful reservation. For each MAC User that makes a successful reservation, the headend unit then allocates bandwidth to the MAC User based on the QoS requirements of the corresponding end user so that the MAC User can transmit user information contention-free over the shared channel.

As the number of MAC Users increases, the performance of the MAC protocol degenerates. This is because, as more MAC Users contend for network resources, the number of collisions increases. As a result, more time is spent resolving the collisions, so less user information is carried by the network.

Also, as the number of MAC Users increases, the complexity of the headend unit increases exponentially. This is because, as the number of MAC Users increases, it becomes more difficult for the headend unit to schedule the MAC User transmissions so as to maintain the QoS requirements of each corresponding end user. As a result, the headend architecture becomes non-scaleable (i.e. an increase in the number of end users results in a disproportionate increase in complexity) which limits the number of end users that can be supported by each headend unit, so more headend units are required with a corresponding increase in the cost of the network.

3

Therefore, a need remains for a system, device, and method for improving MAC performance and scaleability in a contention-based shared medium data communications network.

DETAILED DESCRIPTION

As discussed above, the need remains for a system, device, and method for improving MAC performance and scaleability in a contention-based shared medium communications network. The invention improves MAC performance by aggregating a number of MAC Users into a single Aggregate MAC User (AMU). The MAC Users that are aggregated into an AMU are referred to as Constituent MAC Users (CMUs). The AMU acts as a proxy for its CMUs by contending for network resources on behalf of the CMUs and allocating network resources to the CMUs as needed. From the perspective of the MAC protocol, the AMU acts as a MAC User in place of its CMUs. As a result, the same (or more) end users can be supported using fewer MAC Users, thereby improving the performance of the MAC protocol while minimizing complexity in the headend unit.

CMUs are selected for aggregation according to a predetermined set of criteria. In general, it is preferrable to aggregate CMUs having similar traffic types or QoS objectives. However, any criterion can be used as the basis for aggregation. For example, aggregation can be used to implement a user-defined objective, for example, grouping CMUs based on a user-defined priority hierarchy. Also, aggregation can be used to minimize the number of MAC Users, for example, by having each MAIU aggregate all of its end users into a single AMU. Once created, the AMU is allocated sufficient network resources to allow the QoS objectives of each of its CMUs to be met.

Figure 1:
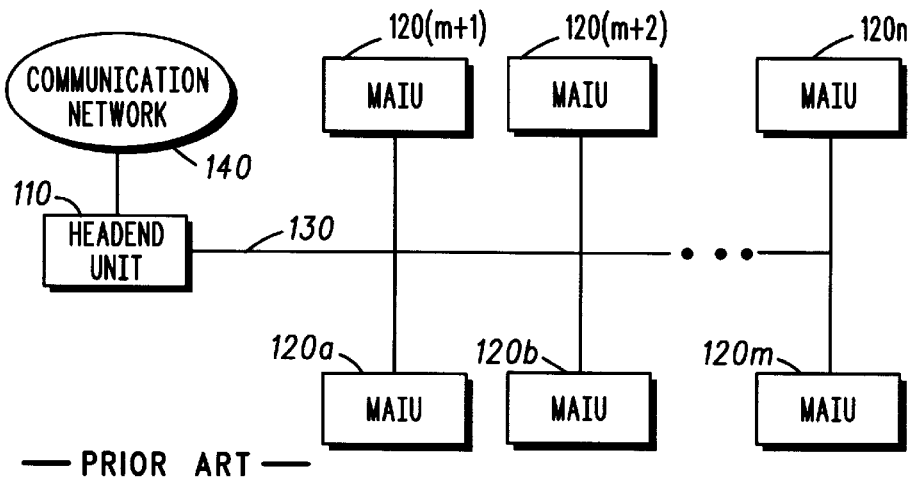
FIG. 1 is a block diagram of a shared medium network as is known in the art.

FIG. 1 is a logical representation of a shared medium network 100 as is known in the art. As illustrated in FIG. 1, a headend unit 110 is coupled to a plurality of MAIUs $120_a$ through $120_n$ (collectively referred to as MAIUs 120) via a shared channel 130. In the preferred embodiment, the shared channel 130 is one of a number of communications channels carried by a shared physical medium such as an HFC or wireless network. In other embodiments, the shared physical medium may be coaxial cable, fiber-optic cable, twisted pair wires, and so on, and may also include air, atmosphere, or space for wireless and satellite communication. The headend unit 110 is also coupled to a communications network 140, which may include networks such as the Internet, on-line services, telephone and cable networks, and other communication systems.

Continuing to refer to FIG. 1, in the preferred embodiment, the shared physical medium, such as an HFC or wireless network, has or supports a plurality of communications channels. For ease of reference, the communications channels in which a headend unit, such as the headend unit 110, transmits information, signals, or other data to an MAIU, such as MAIU $120_n$, are referred to as downstream channels. Also for ease of reference, the communications channels in which an MAIU, such as MAIU $120_n$, transmits information, signals, or other data to a headend unit, such as headend unit 110, are referred to as upstream channels. These various upstream and downstream channels may, of course, be the same physical channel or may be separate physical channels, for example, through time-division multiplexing or frequency-division multiplexing. These various channels may also be logically divided in other ways, in addition to upstream and downstream directions. In the preferred embodiment, the communications medium is an HFC network, with downstream channels in the frequency spectrum (band) typically 50–750 MHz (and up to 1 GHz), and with upstream channels in the frequency spectrum typically 5–42 MHz.

In a simple model of an exemplary HFC network, the headend unit uses a single downstream channel to send information to a group of MAC Users, and a single upstream channel is used by all (or a number) of the group of MAC Users to send information to the headend unit. Since the headend unit is the only device which transmits on the downstream channel, the downstream channel is not a "shared channel" as that term is applied to the present invention. However, since multiple MAC Users transmit on the upstream channel, the upstream channel is a shared channel, and the MAC protocol must provide for orderly access to the channel so as to maximize the data throughput over the channel.

Figure 2:
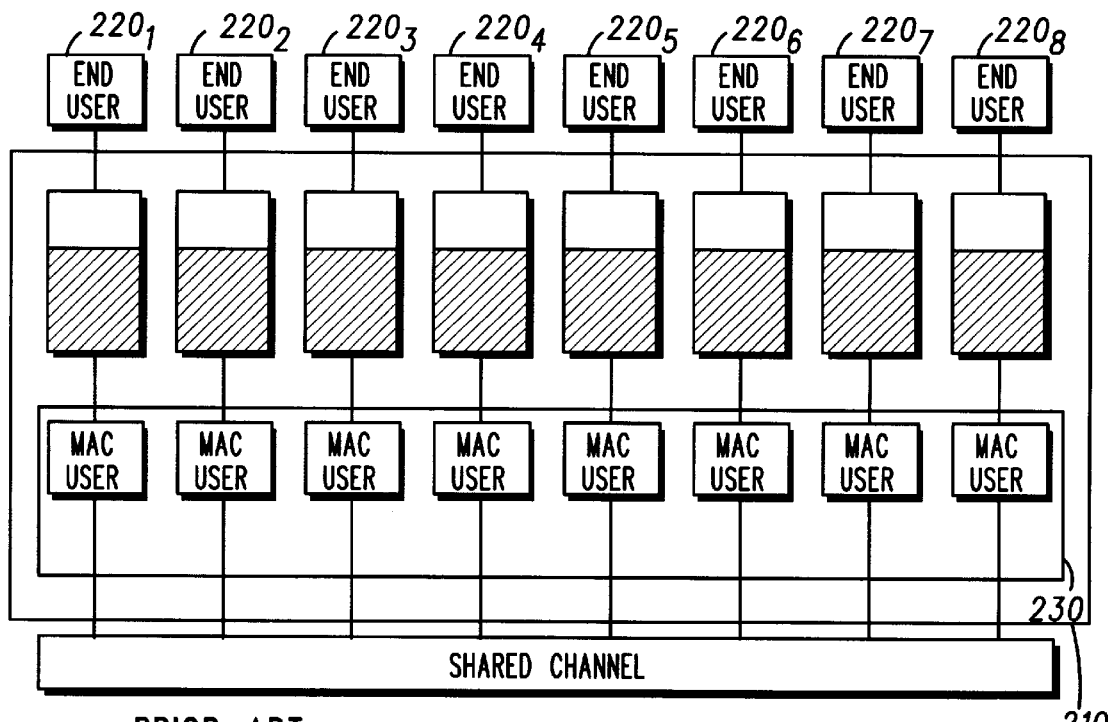
FIG. 2 is a block diagram of an exemplary medium access interface unit as is known in the art.

FIG. 2 is a block diagram of an exemplary MAIU 210 as is known in the art. In this example, eight (8) end users $220_1$–$220_8$ are supported by the MAIU 210. Each end user has specific QoS requirements and is represented by a single MAC User in contending for network resources using the contention-based protocol with reservation described above. A service queue is maintained for each end user so that user information can be buffered while the MAC User is contending for network resources. An Access Controller 230 provides an interface to the shared channel and allows the MAC Users to access the shared channel.

Figure 3:
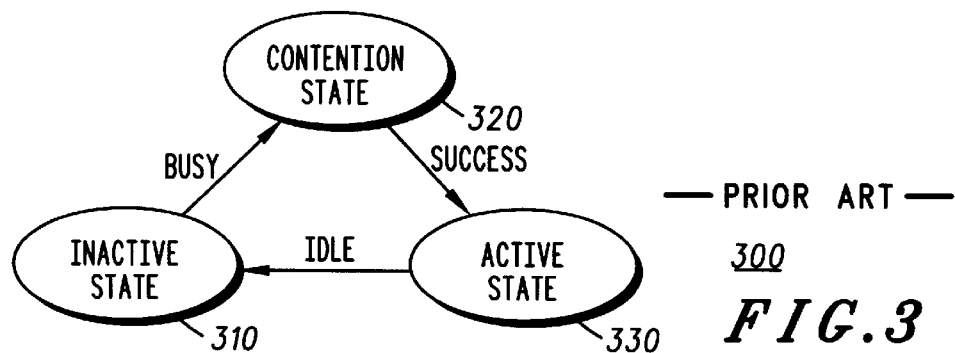
FIG. 3 is a representation of a three-state finite state machine representative of a MAC user as is known in the art.

In the contention-based protocol with reservation, each MAC User can be characterized by a three-state finite state machine 300, as shown in FIG. 3. The MAC User begins in the inactive state 310, and remains in the inactive state as long as the corresponding end user has no user information to transmit. When the end user has user information to transmit, the corresponding MAC User transitions into the contention state 320 and attempts to make a reservation using the contention-based reservation mechanism described above. When the MAC User makes a successful reservation, it transitions into the active state 330. Once active, the MAC User transmits user information contention-free in response to control messages sent by the headend unit. When the end user has no more user information to transmit, the corresponding MAC User transitions back into the inactive state 310.

Referring again to FIG. 2, each of the eight (8) MAC Users contends separately for the shared channel. Thus, the headend unit must maintain statistics information and perform scheduling of upstream transmissions for eight (8) MAC Users so as to maintain the QoS requirements of each end user. Furthermore, if a collision occurs on the upstream channel, then the headend unit must resolve the collision of up to eight (8) MAC Users.

One method of collision resolution, often referred to in the art as "binary tree splitting," involves polling an increasingly smaller and smaller group of MAC Users until each MAC User that needs to transmit has made a successful reservation. Assuming in the above example that all eight (8) MAC Users had been given the opportunity to contend for a reservation, and a collision was detected by the headend unit, then the headend unit successively polls groups of four (4) MAC Users, then groups of two (2) MAC Users, and finally individual MAC Users until the collisions are resolved. Alternatively, the groups can be determined probabilistically.

Figure 4:
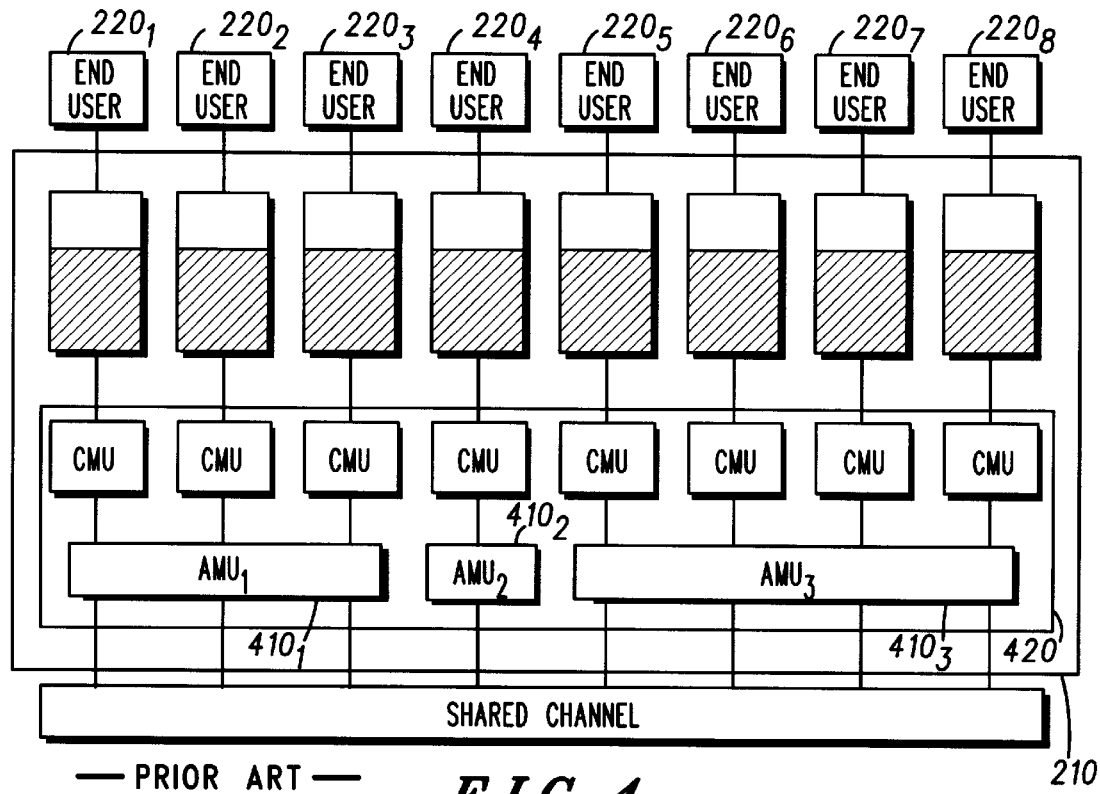
FIG. 4 is a block diagram of an exemplary medium access interface unit in accordance with the present invention.

In one embodiment of the present invention, the MAIU aggregates a first number of MAC Users into a second number of AMUs. An exemplary embodiment is shown in FIG. 4, where eight (8) MAC Users $220_1$–$220_8$ are aggregated into three (3) AMUs $410_1$–$410_3$ by Access Controller 420. Preferably, those MAC Users which are aggregated into a single AMU (i.e. the CMUs) will have the same or similar QoS requirements. Each AMU acts like a prior art MAC User, and can thus be characterized generally by the three-state finite state machine 300 described in FIG. 3.

The state of each AMU, however, is dependent on the aggregation of the CMU states. The AMU is considered to be in the inactive state so long as all of the CMUs are in the inactive state. The AMU is considered to be in the contention state when at least one of the CMUs has user information to transmit and the AMU has not made a successful reservation. The AMU is considered to be in the active state after the AMU has made a successful reservation and so long as at least one of the CMUs has user information to transmit.

More specifically, the AMU starts in the inactive state, where it remains so long as all of its CMUs are inactive. The AMU enters the contention state whenever any one of its CMUs has user information to transmit, at which time the AMU contends for the shared channel on behalf of the CMUs. While the AMU is in the contention state, any number of CMUs can become active, although no action is taken by the AMU since it is already contending on behalf of all CMUs. When the AMU has made a successful reservation, the AMU enters the active state. While the AMU is in the active state, the AMU transmits user information from all active CMUs in response to control messages sent by the headend unit, allocating the network resources so as to meet the QoS requirement of those CMUs. All CMUs that become active while the AMU is active are given the opportunity to transmit, even if a particular CMU had not been active at the time the AMU transitioned into the active state. When an active CMU has no more user information to transmit, the CMU becomes inactive. When all CMUs are inactive, the AMU transitions back to the inactive state.

Figure 5A:
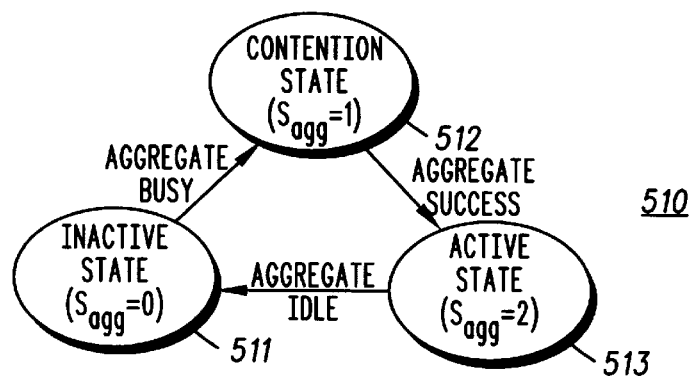
FIG. 5A is a representation of a three-state finite state machine representative of an aggregate MAC user in accordance with the present invention.

An AMU can be characterized by a three-state finite state machine 510, as shown in FIG. 5A. For convenience, the symbol $S_{agg}$ is used as a numerical representation of the state of the AMU, such that $S_{agg}=0$ indicates that the AMU is in an AMU inactive state 511, $S_{agg}=1$ indicates that the AMU is in an AMU contention state 512, and $S_{agg}=2$ indicates that the AMU is in an AMU active state 513.

Figure 5B:
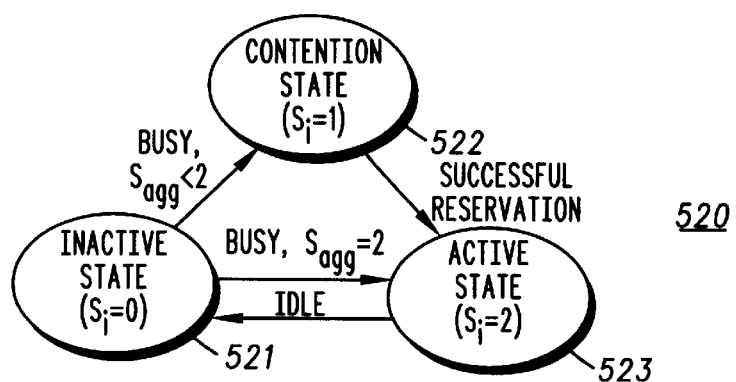
FIG. 5B is a representation of a three-state finite state machine representative of a constituent MAC User in accordance with the present invention.

Each CMU can be characterized by a three-state finite state machine 520, as shown in FIG. 5B. For convenience, the symbol $S_i$ is used as a numerical representation of the state of the CMU, such that $S_i=0$ indicates that the CMU is in a CMU inactive state 521, $S_i=1$ indicates that the CMU is in a CMU contention state 522, and $S_i=2$ indicates that the CMU is in a CMU active state 523.

The two finite state machines 510 and 520 work in conjunction to allow the AMU to contend and allocate resources on behalf of its CMUs. In accordance with the present invention, $S_{agg}=\max(S_i)$.

While the AMU is in the AMU inactive state 511 and all CMUs are in the CMU inactive state 521 (i.e. $S_{agg}=\max(S_i)=0$), if a CMU has user information to transmit, then the CMU enters the CMU contention state 522 and sets its individual state $S_i=1$, making $S_{agg}=\max(S_i)=1$. Consequently, the AMU enters the AMU contention state 512.

When the AMU is in the AMU contention state 512, it participates in contention on behalf of all the CMUs that are in the CMU contention state 522. While the AMU is in the AMU contention state 512, any number of CMUs may transition into the CMU contention state 522 and set their individual states $S_i=1$, and the AMU remains in the AMU contention state 512 since $S_{agg}$ remains unchanged. When the AMU makes a successful reservation, all of the CMUs that had been in the CMU contention state 522 transition into the CMU active state 523 and set their individual states $S_i=2$, making $S_{agg}=\max(S_i)=2$. Consequently, the AMU enters the AMU active state 513.

While the AMU is in the AMU active state 513, the AMU transmits user information from the active CMUs in response to control messages received from the headend unit. When a CMU has no more user information to send, it returns to the CMU inactive state 521 and sets its individual state $S_i=0$. Meanwhile, while the AMU is in the AMU active state 513, any inactive CMU that needs to transmit user information is permitted to transition immediately into the CMU active state 523 and set its individual state $S_i=2$. The AMU remains in the AMU active state 513 as long as $\max(S_i)=2$, that is, as long as at least one CMU remains in the CMU active state 523. When all of the CMUs have returned to the CMU inactive state 521, the AMU returns to the AMU inactive state 511.

Figure 6:
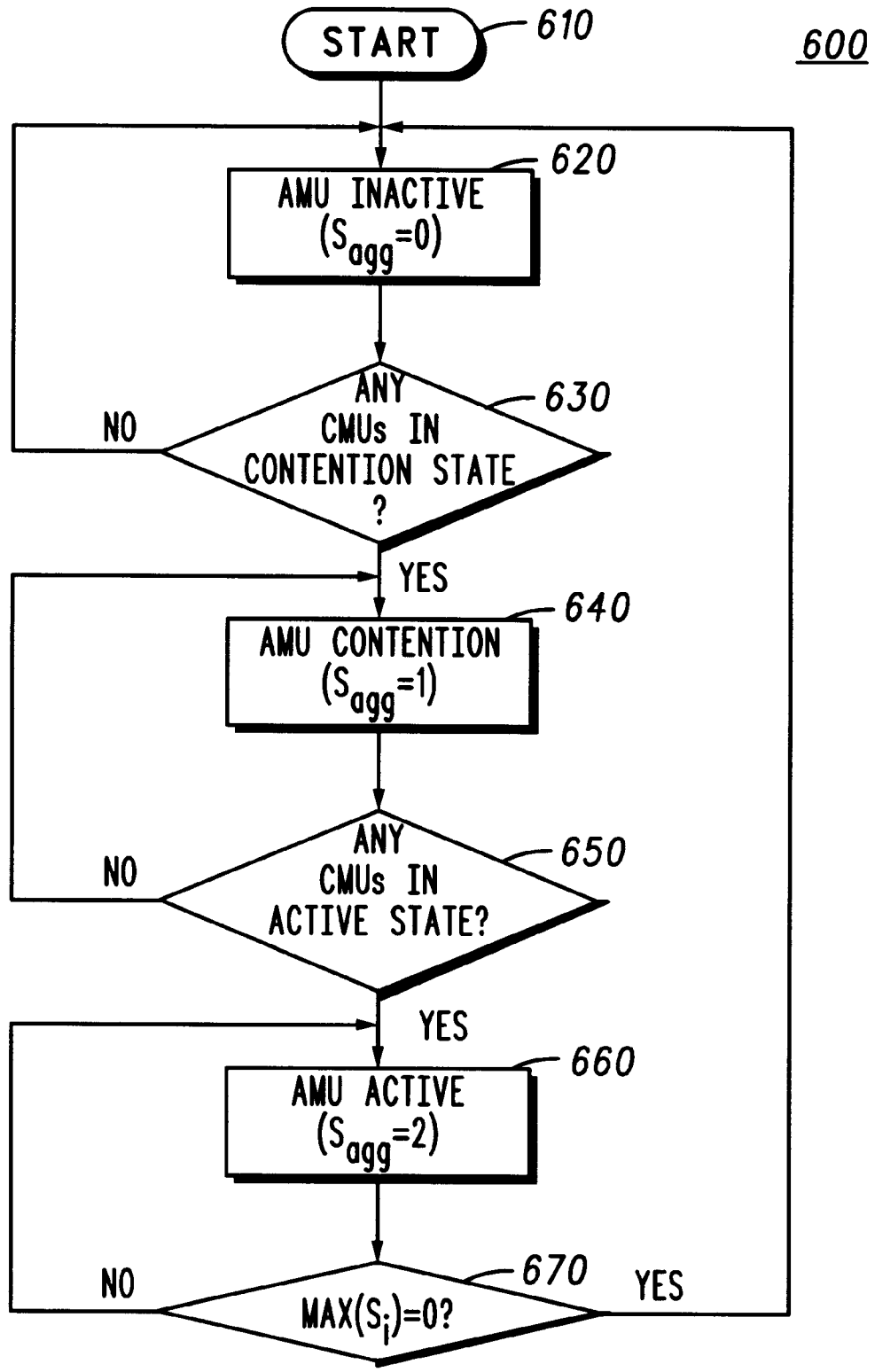
FIG. 6 is a flow diagram for an aggregate MAC user in accordance with the present invention.

FIG. 6 is a flow diagram 600 for the AMU finite state machine 510 in accordance with the present invention. The method starts at step 610 and proceeds to step 620, where the AMU enters the AMU inactive state. The method continually monitors its CMUs, in step 630, to determine whether or not any of the CMUs is in the CMU contention state. Upon the event of any CMU entering the CMU contention state, the method proceeds to step 640, where the AMU enters the AMU contention state and begins contending for the shared channel on behalf of its CMUs. Upon a successful reservation by the AMU, all CMUs in the CMU contention state transition into the CMU active state. The method waits for at least one CMU to enter the CMU active state, in step 650, and then proceeds to step 660, where the AMU enters the AMU active state and transmits user information from any active CMUs. In the AMU active state, the method continually monitors the CMUs, in step 670, to determine whether or not any of the CMUs is in the CMU active state. If at least one CMU is in the CMU active state, then the method returns to step 660, where the AMU remains in the AMU active state. If all CMUs are in the CMU inactive state, then the method proceeds to step 620, where the AMU enters the AMU inactive state.

Figure 7:
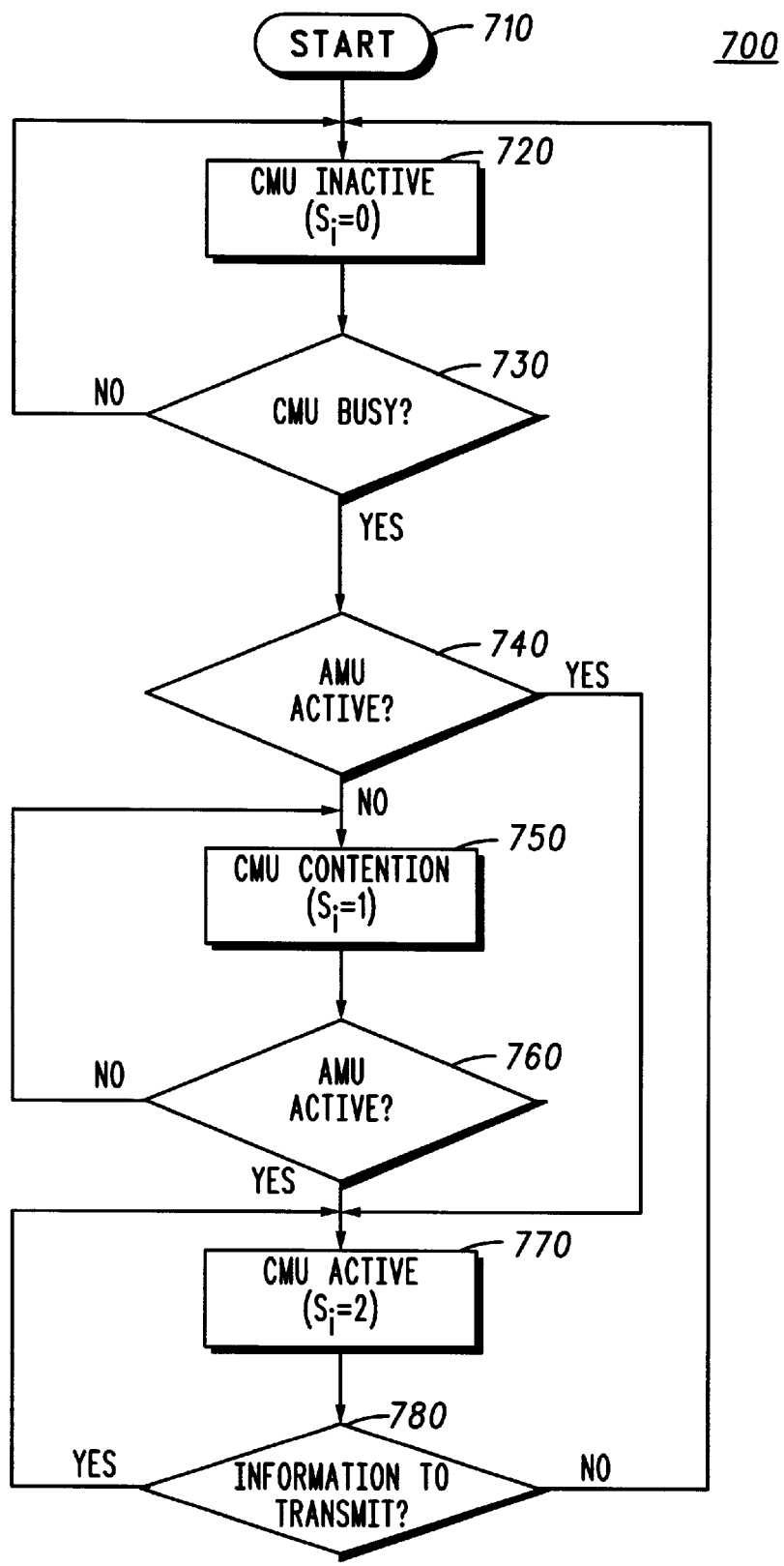
FIG. 7 is a flow diagram for a constituent MAC User in accordance with the present invention.

FIG. 7 is a flow diagram 700 for the CMU finite state machine 520 in accordance with the present invention. The method starts at step 710 and proceeds to step 720, where the CMU is in the CMU inactive state. Upon the event of the CMU having user information to transmit, in step 730, the method tests the state of the AMU of which the CMU is a constituent, in step 740. If the AMU is in the AMU active state, then the method proceeds to step 770, where the CMU enters the CMU active state. If the AMU is in the AMU inactive state or the AMU contention state, then the method proceeds to step 750, where the CMU enters the CMU contention state. The method then waits for the AMU to become active, in step 760, after which the method proceeds to step 770, where the CMU enters the CMU active state. Once the CMU is in the CMU active state, in step 770, the method continually monitors the CMU, in step 780, to determine whether or not the CMU has user information to transmit. If the CMU has user information to transmit, the method returns to step 770, where the CMU remains in the CMU active state. If the CMU has transmitted all of its user information, then the method proceeds to step 720, where the CMU enters the CMU inactive state.

Figure 8:
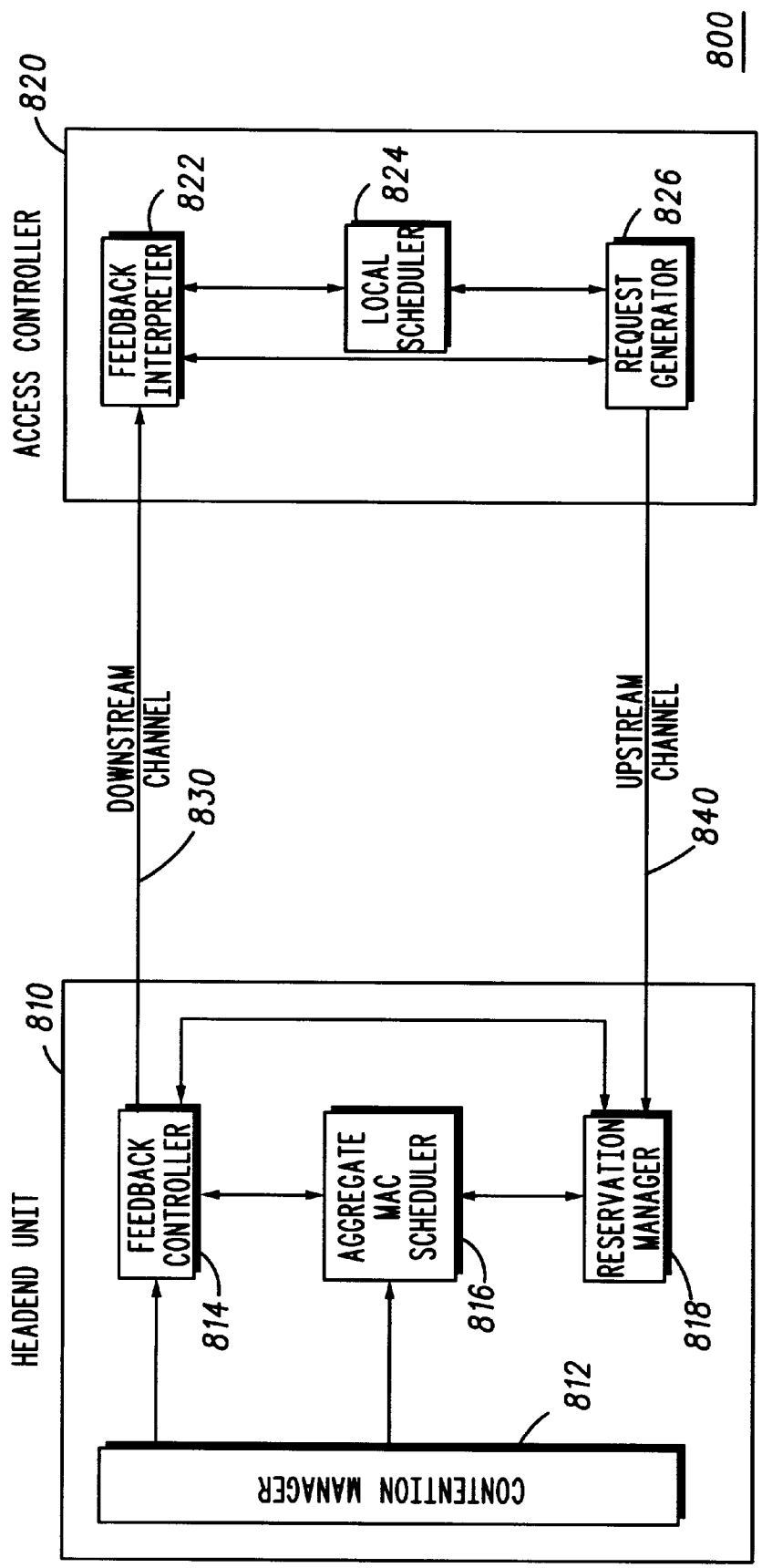
FIG. 8 is a functional block diagram of the elements of a headend unit and an access control unit.

FIG. 8 is a functional block diagram of a system 800 for aggregating MAC Users. Specifically, FIG. 8 shows a Headend Unit 810 operably coupled to an Access Controller 820 of an MAIU by means of a Downstream Channel 830 and an Upstream Channel 840. The Access Controller 820 performs the aggregation function in the MAIU by selecting MAC Users for aggregation according to user-selected or other criteria, and implements the CMU and AMU finite state machines 510 and 520 described above.

Headend Unit 810 includes a Connection Manager 812, a Feedback Controller 814, an Aggregate MAC Scheduler 816, and a Reservation Manager 818. The Connection Manager 812 is responsible for connection admission control to provide an efficient and fair allocation of transmission resources to individual end users subject to QoS constraints. The Connection Manager 812 provides the Aggregate MAC Scheduler 816 with the QoS requirements of each connection that is admitted to the network. The Connection Manager 812 also invokes the Feedback Controller 814 each time there is a new connection established or an existing connection released, so that the Feedback Controller 814 can query the appropriate MAIU for an update of the corresponding AMU state information. The Feedback Controller 814 transmits control information to the MAIUs, and provides feedback on the activities on the Upstream Channel 840, so that the MAIUs may coordinate their upstream transmissions efficiently. The Reservation Manager 818 monitors the Upstream Channel 840, accepts reservation request messages from the AMUs associated with each MAIU, and provides the Headend Unit 810 with requested updates of AMU state information whenever a new connection is established or an existing connection is released. The Aggregate MAC Scheduler 816 determines an efficient schedule for each MAIU to access the Upstream Channel 840 based on the reservation requests of the AMUs associated with the MAIU, the state of the feedback, as well as the QoS constraints provided by the Connection Manager 812.

The Access Controller 820 includes a Feedback Interpreter 822, a Local Scheduler 824, and a Request Generator 826. The Request Generator 826 selects CMUs for aggregation into AMUs according to a predetermined set of criteria, manages the state transition of each AMU, and issues control messages to the Headend Unit 810 in response to queries from the Headend Unit 810. The Request Generator 826 provides the Feedback Interpreter 822 and the Local Scheduler 824 summarized information about the constituent membership and state of each AMU. The Request Generator 826 has a complete knowledge of the CMUs belonging to each AMU, and this information is updated whenever a new connection is established or an existing connection is released. Additionally, the Request Generator 826 may dynamically change the composition of the AMUs according to user-specified or other criteria to form new AMUs, transfer CMUs among existing AMUs, or eliminate AMUs. Whenever there is a change in the composition of an AMU, the change is communicated to the Local Scheduler 824 to enable the Local Scheduler 824 to redistribute transmission opportunities efficiently. The change is also communicated to the Feedback Interpreter 822 for subsequent determination of how transmission opportunities for reservation request messages are to be allocated among the AMUs.

The Feedback Interpreter 822 translates the feedback information it receives from the Headend Unit 810 into control information for subsequent generation of reservation request messages as well as for local scheduling. The Feedback Interpreter 822 receives messages from the Headend Unit 810 on the Downstream Channel 830 containing the following types of information:

1) control information informing the MAIU of transmission opportunities available for the MAIU to send reservation request messages and other control messages (e.g., queried information) on Upstream Channel 840;

2) feedback information regarding the outcome of the transmission of each reservation request message sent by the MAIU; and 3) control information informing the MAIU of transmission opportunities allocated to each of its AMUs for transmission of user data on Upstream Channel 840.

The Feedback Interpreter 822 processes the control information it receives from the Headend Unit 810 together with the summarized state information and congestion status (discussed below) of the AMUs in the MAIU. The Feedback Interpreter 822 communicates to the Local Scheduler 824 the per-CMU allocation information as well as other information pertinent to scheduling of control messages to be transmitted on Upstream Channel 840. The Feedback Interpreter 822 informs the Request Generator 826 of any transmission opportunities available for each AMU to send reservation request messages on Upstream Channel 840.

The Local Scheduler 824 is responsible for redistributing the transmission opportunities allocated to each AMU among and between all of the AMU's CMUs in a fair and efficient manner, subject to the corresponding end users' QoS constraints. The Local Scheduler 824 provides the Feedback Interpreter 822 and Request Generator 826 with congestion status information for each of the AMUs in the MAIU. This information is used by the Feedback Interpreter 822 to adaptively adjust the distribution of future transmission opportunities for reservation request messages, for example, to provide additional transmission opportunities for congested MAC Users. The information is processed by the Request Generator 826 and inserted in the reservation request messages and other control messages that are transmitted on Upstream Channel 840.

Although the embodiments described above aggregate MAC Users into AMUs, coarser-grained aggregates can be constructed. For example, a number of AMUs may themselves be aggregated into a super-AMU using the same rules as discussed above. Coarser aggregates are less likely than finer aggregates to become idle after having been active, and are thus less likely to have to contend at any particular time. This also reduces the overhead due to contention resolution.

When MAC User aggregation is applied in an ATM network, one logical grouping of MAC Users is by ATM Service Category, as described in U.S. patent application entitled Apparatus and Method for Translating QoS Parameters for Per-Service Category Aggregation referred to and incorporated by reference above. For example, a Virtual Path can act as an AMU in place of individual Virtual Channels represented by separate MAC Users. By combining MAC User aggregation and VC aggregation, it may be possible to gain bandwidth efficiency at both the MAC layer and the ATM layer of the protocol stack. However, it is important to note that VC aggregation and MAC User aggregation are applied differently and for different purposes, and it is possible that an aggregate that improves efficiency of the ATM bandwidth utilization may actually reduce the scaleability and efficiency of the MAC protocol, and vice versa. Thus, the applicability of each type of aggregation must be determined by the objectives of the system.

The present invention may be embodied in other specific forms without departing from the spirit or essential characteristics. The described embodiments are to be considered in all respects only as illustrative and not restrictive.

What is claimed is:

1. A method wherein a number of constituent MAC (Medium Access Control) users are represented as a single aggregate MAC user, the single aggregate MAC user acting as a proxy on behalf of the number of constituent MAC users in a contention-based MAC protocol, wherein the step of representing the number of constituent MAC users as the single aggregate MAC user comprises the steps of:

characterizing each constituent MAC user by a constituent MAC user state that is dependent upon an aggregate MAC user state; and characterizing the single aggregate MAC user by the aggregate MAC user state that is dependent upon the number of constituent MAC user states.

2. The method of claim 1 wherein the step of characterizing each constituent MAC user by a constituent MAC user state comprises the steps of:

placing the constituent MAC user in a constituent MAC user inactive state;

when the constituent MAC user has user information to transmit, testing the aggregate MAC user state;

if the aggregate MAC user state is either an aggregate MAC user inactive state or an aggregate MAC user contention state:

placing the constituent MAC user in a constituent MAC user contention state;

monitoring the aggregate MAC user state; and when the aggregate MAC user state enters an aggregate MAC user active state, placing the constituent MAC user in a constituent MAC user active state;

if the aggregate MAC user is in the aggregate MAC user active state, placing the constituent MAC user in the constituent MAC user active state;

when the constituent MAC user has transmitted all of its user information, returning the constituent MAC user to the constituent MAC user inactive state.

3. The method of claim 1 wherein the step of characterizing the aggregate MAC user by an aggregate MAC user state comprises the steps of:

placing the aggregate MAC user in an aggregate MAC user inactive state;

monitoring the state of each of the number of constituent MAC users;

when any one of the number of constituent MAC users enters a constituent MAC user contention state, placing the aggregate MAC user in an aggregate MAC user contention state and contending for the shared medium;

upon a successful reservation by the aggregate MAC user, placing the aggregate MAC user in an aggregate MAC user active state;

monitoring the state of each of the number of constituent MAC users; and when each of the number of constituent MAC users enters a constituent MAC user inactive state, returning the aggregate MAC user to the aggregate MAC user inactive state.

4. The method of claim 1 wherein the step of representing the number of constituent MAC users as the single aggregate MAC user comprises the steps of:

characterizing each constituent MAC user by a set of quality of service requirements; and characterizing the aggregate MAC user by a set of quality of service requirements representing an aggregate of the constituent MAC user quality of service requirements.

5. In a communications network having a headend unit in communication with a medium access interface unit by means of a contention-based medium access control (MAC) protocol, the medium access interface unit comprising:

a request generator creating and maintaining a number of aggregate MAC users, each aggregate MAC user representing a number of constituent MAC users and acting as a proxy on behalf of the number of constituent MAC users;

a feedback interpreter allocating transmission opportunities among the number of aggregate MAC users, the feedback interpreter operably coupled to the request generator for receiving aggregate MAC user status information from the request generator and for providing transmission opportunity information to the request generator; and a local scheduler allocating transmission opportunities among the constituent MAC users for each aggregate MAC user, the local scheduler operably coupled to the request generator for receiving aggregate MAC user status information from the request generator and for providing congestion information to the request generator, and operably coupled to the feedback interpreter for receiving per-constituent MAC user information from the feedback interpreter and for providing congestion information to the feedback interpreter.

6. The medium access interface unit of claim 5 wherein the request generator further comprises:

logic for characterizing each constituent MAC user by a constituent MAC user state that is dependent upon its corresponding aggregate MAC user state; and logic for characterizing the aggregate MAC user by an aggregate MAC user state that is dependent upon its corresponding number of constituent MAC user states.

7. The medium access interface unit of claim 6 wherein the logic for characterizing each constituent MAC user by a constituent MAC user state:

logic for placing the constituent MAC user in a constituent MAC user inactive state;

logic for testing the aggregate MAC user state when the constituent MAC user has user information to transmit;

logic for placing the constituent MAC user in a constituent MAC user contention state if the aggregate MAC user state is either an aggregate MAC user inactive state or an aggregate MAC user contention state;

logic for placing the constituent MAC user in the constituent MAC user active state when the aggregate MAC user is in the aggregate MAC user active state; and logic for returning the constituent MAC user to the constituent MAC user inactive state when the constituent MAC user has transmitted all of its user information.

8. The medium access interface unit of claim 6 wherein the logic for characterizing the aggregate MAC user by an aggregate MAC user state comprises:

logic for placing the aggregate MAC user in an aggregate MAC user inactive state;

logic for monitoring the state of each of the number of constituent MAC users;

logic for placing the aggregate MAC user in an aggregate MAC user contention state when any one of the number of constituent MAC users enters a constituent MAC user contention state;

logic for contending for the shared medium while in the aggregate MAC user contention state;

logic for placing the aggregate MAC user in an aggregate MAC user active state upon a successful reservation by the aggregate MAC user;

logic for monitoring the state of each of the number of constituent MAC users; and logic for returning the aggregate MAC user to the aggregate MAC user inactive state when each of the number of constituent MAC users enters a constituent MAC user inactive state.

9. The medium access interface unit of claim 5 wherein the logic for representing the number of constituent MAC users as the single aggregate MAC user comprises:

logic for characterizing each constituent MAC user by a set of quality of service requirements; and logic for characterizing each of the number of aggregate MAC users by a set of quality of service requirements representing an aggregate of its constituent MAC user quality of service requirements.

10. A system comprising:

a medium access interface unit having:

a request generator creating and maintaining a number of aggregate medium access control (MAC) users, each aggregate MAC user representing a number of constituent MAC users and acting as a proxy on behalf of the number of constituent MAC users;

a feedback interpreter allocating transmission opportunities among the number of aggregate MAC users, the feedback interpreter operably coupled to the request generator for receiving aggregate MAC user status information from the request generator and for providing transmission opportunity information to the request generator; and a local scheduler allocating transmission opportunities among the constituent MAC users for each aggregate MAC user, the local scheduler operably coupled to the request generator for receiving aggregate MAC user status information from the request generator and for providing congestion information to the request generator, and operably coupled to the feedback interpreter for receiving per-constituent MAC user information from the feedback interpreter and for providing congestion information to the feedback interpreter; and a headend unit in communication with the medium access interface unit by means of a contention-based MAC protocol, the headend unit having logic for scheduling contention and transmission opportunities for the number of aggregate MAC users.

* * * * *